Patented May 12, 1942

2,282,783

UNITED STATES PATENT OFFICE 2,282,783

PROCESS OF EXPLODING VEGETATIVE MATERIALS

Sidney Musher, New York, N. Y., assignor to Musher Foundation Incorporated, New York, N. Y., a corporation of New York No Drawing. Application May 6, 1941, Serial No. 392,104

13 Claims. (Cl. 99—82)

The present invention relates to a process of exploding cereals and legumes and particularly relates to processes of treating such cereals and legumes at an elevated pressure and at a high temperature followed by sufficiently quick release thereof to cause an expansion or disruption of the film structure of the cereals or legumes.

It has been found that in the explosion or expansion of cereals, such as rice, wheat, corn, oats and barley, or legumes such as soya beans, peas, chick peas, black eyed beans, lentils, and so forth, and by the use of steam pressure exceeding 200 pounds per square inch and temperatures exceeding about 250° F., there results a loss in many of the food values present in the cereal or legume and also the development of many undesirable qualities.

It is among the objects of the present invention to process such cereals or legumes at elevated temperatures and pressures in such a manner as to cause retention of desirable food qualities thereof and enhancement of the taste, flavor and other desirable characteristics thereof without at the same time substantially increasing the cost of manufacture, or prolonging the length of time required for the treatment of the cereal or legume to put it in final expanded or exploded or puffed condition.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accomplishing the above objects, it has been found that if the hull, bran or exterior of the cereal or legume, as the case may be, is treated in such a way as to render the cereal or legume acidic during the high temperature and pressure treatment, there results an expanded or exploded product which retains a much greater proportion of the food values thereof and which has enhanced flavor, taste and other food characteristics.

This acidic condition of the cereals and legumes or of the bran or hull thereof may be most satisfactorily achieved either by utilizing an acidic atmosphere in the explosion chamber during the high pressure steam treatment or by subjecting the cereals and legumes before treatment in the explosion chamber to an acid treatment before being exploded or expanded.

For example, rice, wheat, barley, oats, buckwheat or other cereal might be sprayed with or soaked in an acidic solution of either a dilute strong mineral acid, such as hydrochloric or sulfuric, or a relatively weak food acid such as acetic, citric, tartaric or malic.

It has been found most desirable to use a non-volatile acid such as sulfuric acid, as the non-volatile acids appear to react more readily under the conditions of explosion and for the purposes of the present invention.

However, where the acid utilized is available in substantially solid form, such as tartaric, citric or malic acid, the acid may be sprayed upon or mixed in finely divided form with the cereal in either dampened or dry condition or it may be dried upon the cereals so that the cereals placed in the explosion chamber contain a sufficient coating of the acid to give the surfaces of the cereal a pH of between 3 and 6, the preferred pH being between 3 and 4.5.

In all instances this acidification may be limited to the skin, hull or surface of the cereal being treated without penetrating substantially into the interior of the mass and particularly without penetrating into or affecting the starch or protein structure of the interior of the cereal or legume being treated.

For example, the cereal or legume or seed may be sprayed with a 2% sulfuric or hydrochloric acid solution, the spray being just sufficient to moisten the exterior of the material or to cause wetting and surface penetration without there being substantial penetration into the interior of the cereal, legume or seed.

If there is excessive external moisture, the acidified surface of the cereal or legume is preferably immediately dried to prevent any loss of water soluble substances normally present in the skin or surface of the cereal or legume.

In no case should there be any extraction or leaching or removal of water soluble substances in the skins, hulls, bran or exterior portion of the cereals or legumes or the seeds which may be treated.

Although not preferred, the cereals or legumes to be treated may also be sprayed or moistened with a dilute sulfuric acid solution after they have been placed in the chamber or barrel of the gun or chamber in which the high temperature steam treatment is to take place.

Desirably where such mixture takes place directly within the chamber, means are provided to rotate the chamber to assure that when the mixture is added or sprayed into the chamber that there will be thorough agitation or mixture of the exterior or surface of the cereals with the acidic material, whether it be a dilute solution of sulfuric, hydrochloric, acetic, or even tartaric acid or the finely divided solid food acids such as tartaric, citric or malic.

As an alternative procedure the acidification may be carried out by vapors introduced with the steam. For example, carbon dioxide may be introduced into the chamber with the steam in sufficient concentration to cause acidification of the hulls, bran or skin of the cereals or legumes to give them a pH of substantially less than 6.

It is also possible to introduce into the chamber vapors of acetic acid or even hydrochloric acid or finely divided suspended tartaric or citric acid together with the steam.

Where acids are introduced into the explosion chamber or into the barrel of an explosion gun it is usually desired to treat the barrel or chamber before-hand so that it be proof against or resistant to the action of acids and the interior may be plated with a resistant metal such as chromium or even made of stainless steel or an alloy of or containing nickel and/or chromium.

Where an acid is introduced with the steam, preferably moist or dried saturated steam at a relatively low temperature and pressure is first introduced into the chamber to cause a thorough saturation of the outside or exterior portion of the cereal or legume with the acid solution and then subsequently steam at a relatively high temperature and pressure is introduced.

For example, in the initial step a relatively low pressure and low temperature steam containing from 10% to 25% of the vapors of hydrochloric acid or acetic acid and having a pressure of between 50 and 150 pounds and at a temperature varying from 250° F. to 325° F. may be introduced into the chamber.

Following this treatment which may be continued for about 5 seconds, steam having a high pressure, for example, of between 185 to 250 pounds per square inch and having a temperature varying from 400° F. to 500° F. may be introduced.

As a general rule, although high pressure saturated steam may be employed it is usually most desirable to use superheated steam having 10° F. to 100° F. of superheat. This superheat will cause a thorough drying out of the surface, which may have been moistened either by way of soaking in an acid solution or by moistening with low temperature steam containing acid vapors.

Although not preferred, in addition to the acid treatment of the hull, skins or bran of the cereal or legume, it is also possible to mix such cereal or legume with finely divided inert relatively non-acid and non-alkaline salt such as the various potassium or sodium salts of strong acids, such as potassium or sodium chloride, sulphate or acetate which preferably are combined with a molecule of acid to cause formation of an acid salt.

Among the preferred compounds of this characteristic that may be utilized are potassium acid sulfates, sodium acid sulfates, potassium hydrogen chloride, sodium hydrogen chloride, or less preferably the salts of strong acids and weak bases which will not injure or disadvantageously affect the food properties of the expanded or exploded cereal or legume.

Although not necessary, it is usually preferred in all instances to explode the whole cereals or the whole legumes including their hulls, germ, skin or bran and to carry out the processes in such a way that the hull, skin, bran or germ will be kept upon the exploded or expanded structure disrupted material obtained after the instantaneous release of the elevated steam pressure.

This skin, bran, hull or germ may of course be broken up and more or less retained over the surface of the greatly enlarged expanded or exploded cereal or legume.

Although as stated above, it is generally merely sufficient to moisten or cause penetration of the acidic material into the hull, skin, bran or germ, it is also sometimes quite desirable to cause a slight penetration of moisture into the exterior of the seeds or cereal and to cause a slight gelatinization or partial gelatinization of starch or protein content. Where there has been a substantial amount of moisture or acid soaked into or impregnated into the interior structure of the cereal or legume it is important either that the cereal or legume be dried out before being placed in the explosion chamber or that the steam be introduced at a sufficiently elevated temperature to cause a thorough drying out or evaporation of all of the water present in the material.

In all cases, it is most important, however, that such acid treated cereal or legume be subjected to no leaching or extraction of desirable food materials from the hull, skin, bran or germ.

After the instantaneous release of the elevated steam pressure followed by ejection of the cereal or legume in expanded condition, such material may be screened to remove any powder or loose materials therefrom and may be used as such as a breakfast food or as a cereal.

Preferably however, the material is most desirably employed in ground condition and it is ground up together with any adherent bran, skin, germ or hull and is used as such either as an addition for flour or for mixture with sodium phosphate, salt, starch, cereal flours, cereal germ flours, spices, dry skim milk, powdered whey, crude or refined sugar to form a mixture containing anywhere from 10% to 90% of the expanded acidified powdered or ground floured cereal.

It has been found particularly desirable to grind the exploded material to finer than 50 mesh and desirably to 75 to 100 mesh.

Where the cereal or legume has been subjected to the fine grinding operation after the acidification or expansion, the puffed flour or powder obtained after the grinding with or without the addition of fillers, such as sugar, salt, cereal flours, starch, powdered skim milk, and powdered whey, etc., may be added in small quantities varying from 0.5% to 5% to milk, liquid dairy cream, ice cream mixes, sherbets, mayonnaise, orange juice, lemon juice and other citrus fruit juices, candy mixes such as buttercream mixes and caramel mixes, etc., to retard oxidative deterioration thereof.

Such finely divided cereal flours with or without diluents or mixes as above stated may also be utilized for addition to aqueous brine used in the curing of meats and fishery products or may be used in sizing or coating for paper and other materials which may be subject to oxidation.

The acidified puffed cereal flours are also particularly satisfactory for addition to various types of cereal products, such as wheat flakes, oat flakes, etc., to retard development of rancidity or oxidative deterioration of the oil or other oxidative materials contained therein, or these products may be used in the production of quick cooking soups in combination with spices.

These acidified cereals or legumes in powdered or flour form may also be utilized for dusting over oxidizable food compositions such as potato chips, nuts, bacons, hams, fish and other food products.

Although not preferred, together with the acidic treatment other types of vapors may also be employed, such as smoke vapors in which connection various types of wood smoke or fumes may be introduced into the explosion chamber or used for either treatment of or impregnation into the cereals of seeds before, during or after the explosion treatment and before or after the powdering or flouring treatment.

The puffed cereal flours of the present invention may be extracted, particularly by the use of water and alcohol, much more readily than the unpuffed cereal flours. The solvents that may be employed for extracting these cereal flours in order to produce highly potent antioxygenic extracts include water, desirably in an acidified condition such as at a pH of between 4 and 6.9, alcohol or water-alcohol mixtures, such alcohols being employed as ethyl alcohol, methyl alcohol, butyl alcohol, or other organic solvent extracts such as acetone and hydrocarbons.

Particularly in the case of the water soluble extracts which are removed from these puffed cereal flours, such water soluble extracts, preferably after concentration to between about 50% and 80% total solids, may be applied to carriers such as to salt, sugar, skim milk, whey, starch and cereal flours which may be used to carry the antioxygenic water soluble extracts of the puffed cereals.

The puffing of food products in a slightly acidified condition or in an acid atmosphere has been found of particular importance regardless of whether the finished puffed or exploded food such as the cereal, cereal germ, seed, nut, spice, cocoa, coffee, fish or meat etc. is subsequently ground to a fine flour following the puffing treatment and it is particularly important for the puffing to be conducted in the acidified medium to obtain a puffed cereal or other food having novel desirable and nutritious characteristics.

The germinated or sprouted cereals, cereal germs or seeds may similarly be puffed, desirably in an acidified condition and then utilized in accordance with the present invention.

In addition to the legumes, cereals and cereal germs, in germinated or ungerminated, sprouted or unsprouted condition there may also be utilized the nuts and oil containing seeds, such as sesame, sunflower seed, peanuts and cottonseed.

The present application is a continuation in part of application, Serial No. 331,184 filed April 23, 1940.

Having described my invention, what I claim is:

1. The method of preparing novel steam exploded materials which comprises subjecting a vegetative material selected from the group consisting of the cereals, cereal germs, legumes, nuts and oil containing seeds to an elevated temperature and pressure while in acidified condition of between pH 3 and pH 6, and instantaneously releasing such pressure, whereby steam explosion of the material is obtained.

2. The method of preparing novel steam exploded vegetative materials selected from the group consisting of the cereals, cereal germs, legumes, nuts and oil containing seeds which comprises subjecting them to an elevated steam pressure with an introduction of acid into the explosion chamber whereby the vegetation material is adjusted to between pH 3 and pH 6, and instantaneously releasing such pressure, whereby steam explosion of the material is obtained.

3. The method of preparing novel steam exploded vegetative materials selected from the group consisting of the cereals, cereal germs, legumes, nuts and oil containing seeds which comprises acidifying the surface of the vegetative material to between pH 3 and pH 6, drying said material, subjecting said material to steam at an elevated pressure and at between pH 3 and pH 6 and instantaneously releasing the pressure, whereby steam explosion of the material is obtained.

4. The method of preparing novel steam exploded materials which comprises subjecting a vegetative material selected from the group consisting of the cereals, cereal germs, legumes, nuts and oil containing seeds to an elevated temperature and pressure while at between pH 3 and pH 4.5 and instantaneously releasing such pressure, whereby steam explosion of the material is obtained.

5. The method of preparing novel steam exploded materials which comprises acidifying a vegetative material selected from the group consisting of the cereals, cereal germs, legumes, nuts and oil containing seeds to between pH 3.0 and pH 4.5, subjecting said vegetative material to over 250° F. and over 200 pounds pressure while in acidified condition and instantaneously releasing such pressure.

6. The method of preparing novel steam exploded cereals which comprises subjecting said cereal to an elevated temperature and pressure while at between pH 3 and pH 6, and instantaneously releasing such pressure, whereby steam explosion of the cereal is obtained.

7. The method of preparing novel steam exploded oats which comprises subjecting said oats to an elevated temperature and pressure while at between pH 3 and pH 6, and instantaneously releasing such pressure, whereby steam explosion of the oats is obtained.

8. The method of preparing novel steam exploded legumes which comprises subjecting said legumes to an elevated temperature and pressure while at between pH 3 and pH 6, and instantaneously releasing such pressure, whereby steam explosion of the legumes is obtained.

9. The method of preparing novel steam exploded peas which comprises subjecting said peas to an elevated temperature and pressure while at between pH 3 and pH 6, and instantaneously releasing such pressure, whereby steam explosion of the peas is obtained.

10. The method of preparing novel steam exploded beans which comprises subjecting said beans to an elevated temperature and pressure while at between pH 3 and pH 6, and instantaneously releasing such pressure, whereby steam explosion of the beans is obtained.

11. The method of preparing novel steam exploded materials which comprises subjecting a vegetative material selected from the group consisting of the cereals, cereal germs, legumes, nuts and oil containing seeds to an elevated temperature and pressure while in acidified condition of between pH 3 and pH 6, and then instantaneously releasing such pressure, whereby steam explosion of the material is obtained, the steam pressure being effected by the use of superheated steam.

12. The method of preparing novel steam exploded materials which comprises acidifying a vegetative material selected from the group consisting of the cereals, cereal germs, legumes, nuts and oil containing seeds at a relatively low temperature and pressure to between pH 3 and pH 6, subjecting said vegetative material to a relatively high temperature and pressure while in said acidified condition, and then instantaneously releasing such pressure, whereby steam explosion of the material is obtained.

13. The method of preparing novel steam exploded materials which comprises acidifying a vegetative material selected from the group consisting of the cereals, cereal germs, legumes, nuts and oil containing seeds to between pH 3 and pH 6, drying said acidified vegetative material, subjecting said acidified dried vegetative material to an elevated temperature and pressure while in acidified condition of between pH 3 and pH 6, and then instantaneously releasing such pressure, whereby steam explosion of the material is obtained.

SIDNEY MUSHER.